(12) United States Patent
Kuwajima et al.

(10) Patent No.: US 10,614,778 B2
(45) Date of Patent: Apr. 7, 2020

(54) TRANSFER CONTROL DEVICE, TERMINAL DEVICE, AND TRANSFER CONTROL METHOD

(71) Applicant: SHARP KABUSHIKI KAISHA, Sakai, Osaka (JP)

(72) Inventors: Hidenori Kuwajima, Sakai (JP); Junki Asai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 59 days.

(21) Appl. No.: 15/571,468

(22) PCT Filed: Jul. 26, 2016

(86) PCT No.: PCT/JP2016/071909
§ 371 (c)(1),
(2) Date: Nov. 2, 2017

(87) PCT Pub. No.: WO2017/038309
PCT Pub. Date: Mar. 9, 2017

(65) Prior Publication Data
US 2019/0156789 A1 May 23, 2019

(30) Foreign Application Priority Data
Aug. 31, 2015 (JP) .................. 2015-171369

(51) Int. Cl.
| G09G 5/18 | (2006.01) |
| G09G 5/12 | (2006.01) |
| G09G 5/391 | (2006.01) |
| H04N 19/172 | (2014.01) |
| H04N 19/112 | (2014.01) |

(Continued)

(52) U.S. Cl.
CPC .............. *G09G 5/18* (2013.01); *G09G 5/005* (2013.01); *G09G 5/006* (2013.01); *G09G 5/12* (2013.01); *G09G 5/391* (2013.01); *H04N 19/112* (2014.11); *H04N 19/137* (2014.11); *H04N 19/146* (2014.11); *H04N 19/172* (2014.11); *G09G 2310/0224* (2013.01);
(Continued)

(58) Field of Classification Search
CPC ........................................................ G09G 5/18
USPC ........................................................ 345/467
See application file for complete search history.

(56) References Cited

U.S. PATENT DOCUMENTS 6,501,904 B1 * 12/2002 Kuroda ................ G11B 27/032
348/E7.003
9,867,187 B2 * 1/2018 Wei .................... H04W 72/1268
(Continued)

FOREIGN PATENT DOCUMENTS

| CN | 101308646 A | 11/2008 |
| CN | 104123906 A | 10/2014 |

(Continued)

*Primary Examiner* — Javid A Amini
(74) *Attorney, Agent, or Firm* — ScienBiziP, P.C.

(57) ABSTRACT

The present invention provides a transfer control device capable of reducing an electric power consumption and suppressing a decrease in display quality. A host processor (101) of the present invention includes a display data transmitting circuit (11) which transmits display data to a driver (102) by an interlace method or a non-interlace method, depending on a transmission amount of the display data, which transmission amount is identified by a transmission amount identifying circuit (10).

6 Claims, 8 Drawing Sheets

(51) Int. Cl.
*H04N 19/137* (2014.01)
*G09G 5/00* (2006.01)
*H04N 19/146* (2014.01)

(52) U.S. Cl.
CPC . *G09G 2320/103* (2013.01); *G09G 2330/021* (2013.01); *G09G 2350/00* (2013.01)

(56) References Cited

U.S. PATENT DOCUMENTS

| | | | | |
|---|---|---|---|---|
| 2002/0089518 | A1* | 7/2002 | Shigeta | G06F 3/14 345/629 |
| 2004/0008173 | A1* | 1/2004 | Maeda | G09G 3/3688 345/99 |
| 2004/0095334 | A1* | 5/2004 | Hong | G06F 3/045 345/173 |
| 2005/0080939 | A1* | 4/2005 | Onuma | G09G 5/006 710/8 |
| 2006/0158571 | A1* | 7/2006 | Tsunoda | H04N 5/4403 348/734 |
| 2007/0274288 | A1* | 11/2007 | Smith | H04L 5/0092 370/351 |
| 2008/0186292 | A1 | 8/2008 | Park et al. | |
| 2008/0284768 | A1* | 11/2008 | Yoshida | G09G 3/2022 345/208 |
| 2009/0009455 | A1* | 1/2009 | Kimura | G09G 3/2074 345/89 |
| 2009/0016265 | A1* | 1/2009 | Katayama | H04L 1/1819 370/328 |
| 2009/0129333 | A1* | 5/2009 | Khandekar | H04W 72/1226 370/330 |
| 2010/0182207 | A1* | 7/2010 | Miyata | H01L 27/13 343/702 |
| 2010/0328269 | A1* | 12/2010 | Kurokawa | G06F 3/0416 345/175 |
| 2012/0113164 | A1* | 5/2012 | Furukawa | G09G 3/3426 345/690 |
| 2015/0310814 | A1* | 10/2015 | Umekida | G09G 3/3611 345/690 |
| 2016/0174214 | A1* | 6/2016 | Yerramalli | H04W 72/0413 370/329 |
| 2016/0246657 | A1* | 8/2016 | Pope | H04L 49/9094 |

FOREIGN PATENT DOCUMENTS

| | | |
|---|---|---|
| JP | H10-91125 A | 4/1998 |
| JP | 2002-23719 A | 1/2002 |
| JP | 2008-20934 A | 1/2008 |
| JP | 2003-143556 A | 5/2013 |
| JP | 2015-61108 A | 3/2015 |

* cited by examiner

TRANSFER CONTROL DEVICE, TERMINAL DEVICE, AND TRANSFER CONTROL METHOD

TECHNICAL FIELD

The present invention relates to a transfer control device, a terminal device, and a transfer control method for controlling a transfer of display data from a video image source to a display device.

BACKGROUND ART

In general, an electric power consumption of a liquid crystal panel can be represented by $CfV^2$, where (i) C is a capacitance included in scanning lines and signal lines of the liquid crystal panel, (ii) f is a drive frequency, and (iii) V is a drive voltage. That is, an electric power consumption is large during displaying of moving images when a drive frequency f is high. An electric power consumption is small during displaying of still images when a drive frequency f is low.

Therefore, in order to reduce an overall electric power consumption while a liquid crystal panel displays moving images and still images, it is preferable to reduce an electric power consumption during displaying of moving images. For example, Patent Literature 1 discloses a technique in which, in a case where a moving image or a quasi-moving image (scrolling image) consuming a large amount of electric power is displayed, an electric power consumption is reduced by displaying the moving image or the quasi-moving image on a low-resolution screen obtained by lowering a critical resolution.

CITATION LIST

Patent Literature

[Patent Literature 1]
Japanese Patent Application Publication, Tokukaihei, No. 10-91125 (Publication Date: Apr. 10, 1998)

SUMMARY OF INVENTION

Technical Problem

Note that a terminal device including a display device, such as a smartphone, is equipped with an apparatus for supplying display data to the display device (such an apparatus will be hereinafter referred to as "host processor"). In considering an electric power consumption of such a terminal device, it is necessary to also consider, in addition to an electric power consumption of a display device, an electric power consumption in a transmission line via which display data is transmitted from a host processor to the display device. In other words, considering the electric power consumption of the terminal device requires considering an entire system including the display device and the host processor.

In general, an increase in bandwidth of display data in such a transmission line results in an increase in transmission rate, so that an electric power consumption is increased. A decrease in bandwidth of display data results in a decrease in transmission rate, so that an electric power consumption is reduced. Therefore, a bandwidth of a moving image data having a high transmission rate is narrowed by, for example, lossy data compression. In addition, an electric power consumption is reduced by lowering the transmission rate.

However, the following problem arises. In a case where moving image data is subjected to lossy data compression, the moving image data needs to be decompressed at a receiving end by which the moving image data is received, that is, the moving image data needs to be decompressed by a display device. Then, the moving image data, which has been decompressed, is not exactly the same as the original moving image data but is degraded by a notable level. This unfortunately decreases the display quality of a moving image to be displayed by the display device.

The present invention has been made in view of the problem, and it is an object of the present invention to provide a transfer control device, a terminal device, and a transfer control method, each of which can (i) reduce an electric power consumption of an entire system including a display device and a host processor and (ii) suppress a decrease in display quality of a video image which is displayed by the display device.

Solution to Problem

In order to attain the object, a transfer control device in accordance with an aspect of the present invention is a transfer control device for controlling a transfer of display data from a video image source to a display device, including: a transmission amount identifying section which identifies a transmission amount of display data to be transferred to the display device; and a display data transmitting section which transmits, to the display device, the display data by an interlace method or a non-interlace method, depending on the transmission amount identified by the transmission amount identifying section.

A transfer control method in accordance with an aspect of the present invention is a method for controlling a transfer of display data from a video image source to a display device, including: a first step of identifying a transmission amount of display data to be transferred to the display device; and a second step of transmitting, to the display device, the display data by an interlace method or a non-interlace method, depending on the transmission amount identified in the first step.

Advantageous Effects of Invention

With an aspect of the present invention, it is advantageously possible to (i) reduce an electric power consumption of an entire system including a display device and a host processor and (ii) suppress a decrease in display quality of a video image which is displayed by the display device.

DESCRIPTION OF EMBODIMENTS

Embodiment 1

The following description will discuss an embodiment of the present invention in detail. Embodiment 1 will discuss an example in which a transfer control device of the present invention is applied to a smartphone which serves as a terminal device including an apparatus for supplying display data to a display device. This also applies to Embodiments 2 and 3. Note that there are examples, other than the smartphone, of a terminal device which can be applied to the present invention, such as (i) a personal computer including a display device, (ii) a television (TV) including a display device, and (iii) a terminal device, other than a personal computer and a television, which includes a display device and a host processor.

(Smartphone)

Figure 1:
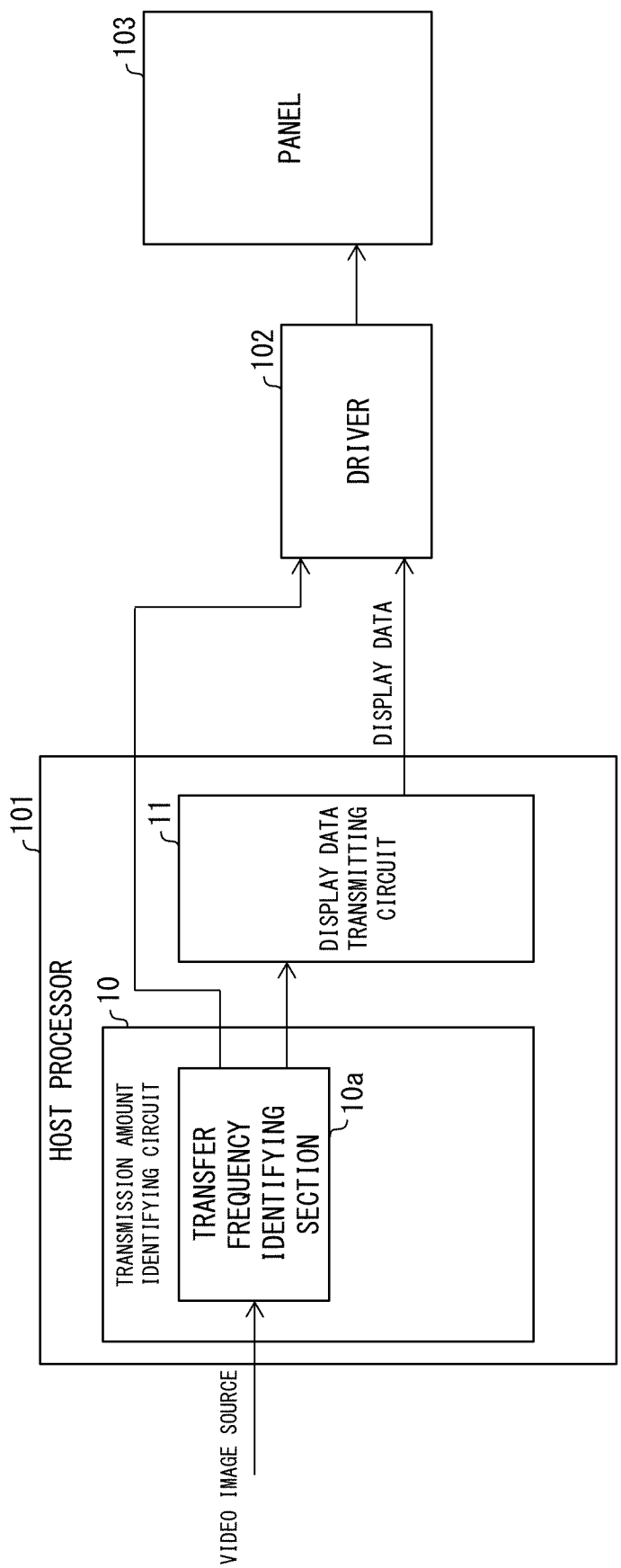
FIG. 1 is a block diagram schematically illustrating a configuration of a smartphone in accordance with Embodiment 1 of the present invention.

FIG. 1 is a block diagram schematically illustrating a configuration of the smartphone in accordance with Embodiment 1.

As illustrated in FIG. 1, the smartphone is configured so that a host processor (transfer control device) 101 transfers display data, which has been supplied from a video image source, to a display device (driver 102, panel 103). The display device operates so that (i) the driver 102 transmits, to the panel 103, a drive signal which is based on the display data transferred from the host processor 101 and then (ii) the panel 103 displays a video image corresponding to the drive signal transmitted from the driver 102. Note that the panel 103 is a liquid crystal panel. A method for driving the liquid crystal panel in Embodiment 1 is not particularly limited, and can be any method.

(Host Processor 101)

The host processor 101 is a transfer control device for controlling a transfer of display data from a video image source to the display device (driver 102, panel 103). The host processor 101 includes (i) a transmission amount identifying circuit (transmission amount identifying section, first step) 10 which identifies a transmission amount of display data to be transferred to the display device and (ii) a display data transmitting circuit (display data transmitting section, second step) 11 which transmit, to the display device, the display data by an interlace method or a non-interlace method, depending on the transmission amount of the display data thus identified by the transmission amount identifying circuit 10.

(Transmission Method for Transmitting Display Data)

Figure 3:
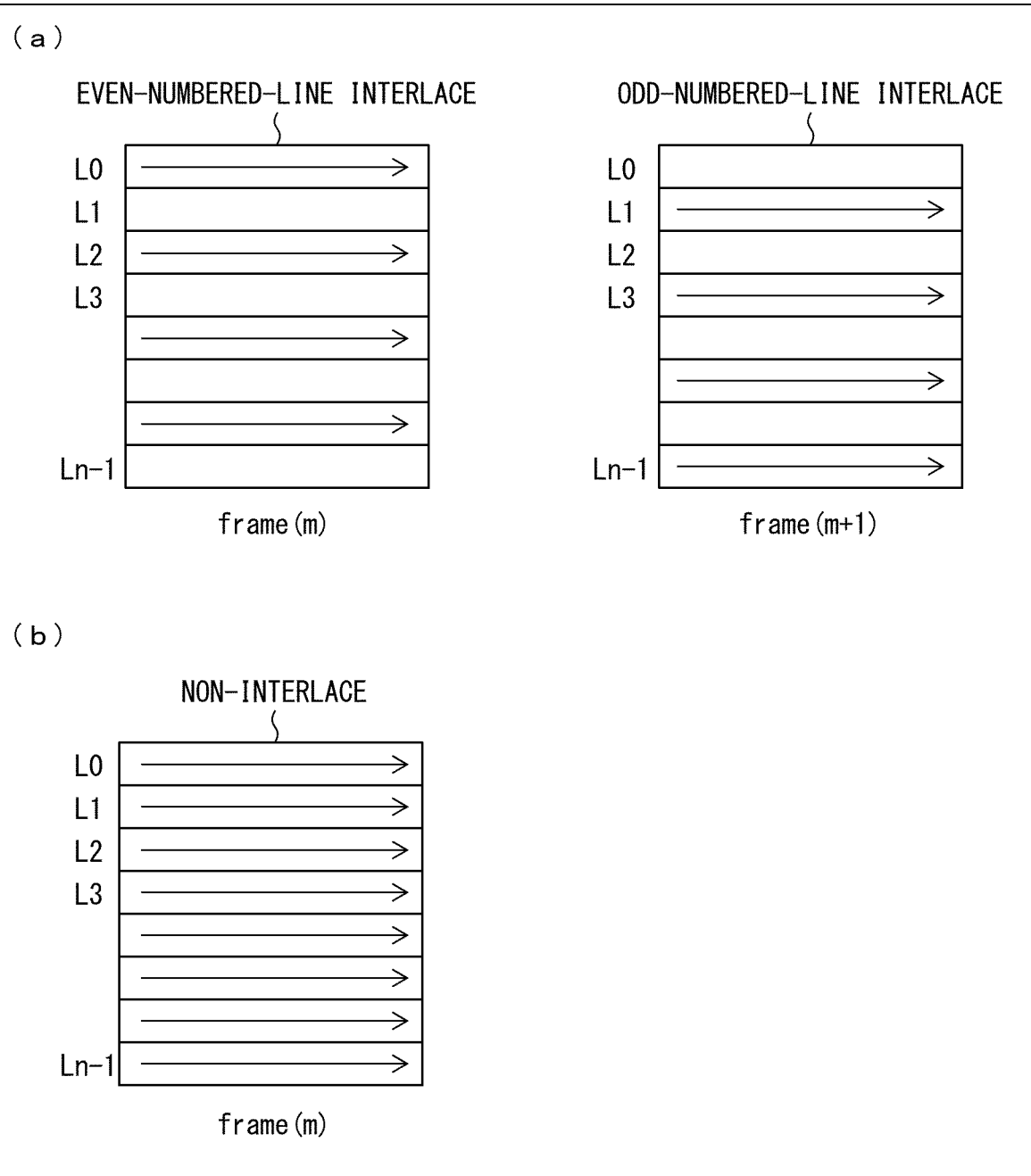
FIG. 3 is a set of views for describing a transmission method for transmitting display data. (a) of FIG. 3 is a view for describing an interlace method. (b) of FIG. 3 is a view for describing a non-interlace method.

A transmission method, by which the host processor 101 transmits display data to the display device, will be described below. (a) of FIG. 3 illustrates an interlace method as a method for transmitting display data. (b) of FIG. 3 illustrates a non-interlace method as a method for transmitting display data.

According to the interlace method, pieces of display data of one frame are transmitted to the display device while the pieces of display data are divided into (i) those of even-numbered lines (L0, L2, . . . ) shown on the left side (frame (m)) of (a) of FIG. 3 and (ii) those of odd-numbered lines (L1, L3, . . . Ln−1) shown on the right side (frame (m+1)) of (a) of FIG. 3. Specifically, display data of one frame is transmitted by (i) sequentially transmitting, in order from the top, all of pieces of display data of even-numbered lines on the left side of (a) of FIG. 3 and then (ii) sequentially transmitting, in order from the top, all of pieces of display data of odd-numbered lines on the right side of (a) of FIG. 3.

On the other hand, according to the non-interlaced transmission, pieces of display data of one frame (frame (m)) are not divided into those of even-numbered lines and those of odd-numbered lines, but, as illustrated in (b) of FIG. 3, the pieces of all of lines (L0, L1, L2, L3, . . . Ln−1) are sequentially transmitted to the display device.

A transmission amount (the number of lines) of display data, which is transmitted to the display device, is smaller in the case of the interlace method illustrated in (a) of FIG. 3 than in the case of the non-interlaced transmission. Therefore, with the interlace method, it is possible to narrow a bandwidth in a transmission line between the display data transmitting circuit 11 and the display device. This allows for a reduction in transmission rate at which display data is transmitted, and therefore allows for a reduction in electric power consumption.

In a case where a transmission amount of display data is large, display data can be transmitted to the display device by the interlace method in order to narrow the bandwidth. This makes it unnecessary, unlike conventional techniques, to subject the display data to lossy data compression in order to narrow the bandwidth. Hence, unlike a case where lossy data compression is carried out, a video image displayed by the display device is not degraded from an original video image, and it is therefore possible to suppress a decrease in display quality of the video image displayed by the display device. A moving image, which has a resolution of approximately 4 K (3840×2160 or 4096×2160) that is higher than a resolution of Full HD (1920×1080), contains a large amount of information. This causes degradation by lossy data compression to be remarkable. Therefore, it is effective to transmit display data by the interlace method particularly in the case of 4 K resolution.

Therefore, an electric power consumption can be reduced and a decrease in display quality can be suppressed by selecting a display data transmission method, the interlace method or the non-interlace method, depending on a transmission amount of display data, which transmission amount is identified by the transmission amount identifying circuit 10. For example, the display data transmitting circuit 11 can be configured so that in a case where a transmission amount of display data identified by the transmission amount identifying circuit 10 is a preset value or more, the display data transmitting circuit 11 transmits display data to the display device by the interlace method. The preset value (transmission amount) is preferably set such that a bandwidth (transmission rate) in a transmission line when display data is transmitted is lower than a certain value so that an electric power consumption for transmitting the display data is not more than a certain value.

Note that a transmission amount of display data can be expressed by various parameters. Examples of possible parameters encompass a data transfer frequency. Data transfer frequency is a transfer frequency at which display data is transferred from a video image source to a display device. A transfer frequency is set per display data. Ordinarily, display data is transferred at a transfer frequency thus set for the display data. However, in a case where a transfer frequency is at such a high value as 120 Hz, an electric power consumption during a transfer of display data increases. An example, in which a transmission method for transmitting display data is switched with use of a transfer frequency, will be described below.

As illustrated in FIG. 1, the transmission amount identifying circuit 10 includes a transfer frequency identifying section 10*a* for identifying a data transfer frequency at which display data is transferred to the display device. The transfer frequency identifying section 10*a* identifies a data transfer frequency which is set for display data that has been transmitted from a video image source. The result of the identification is transmitted to the display data transmitting circuit 21 and to the driver 102. Then, depending on the transfer frequency identified by the transfer frequency identifying section, the display data transmitting circuit 11 transmits the display data to the display device by an interlace method or a non-interlace method.

(Process of Selecting Transmission Method)

Figure 2:
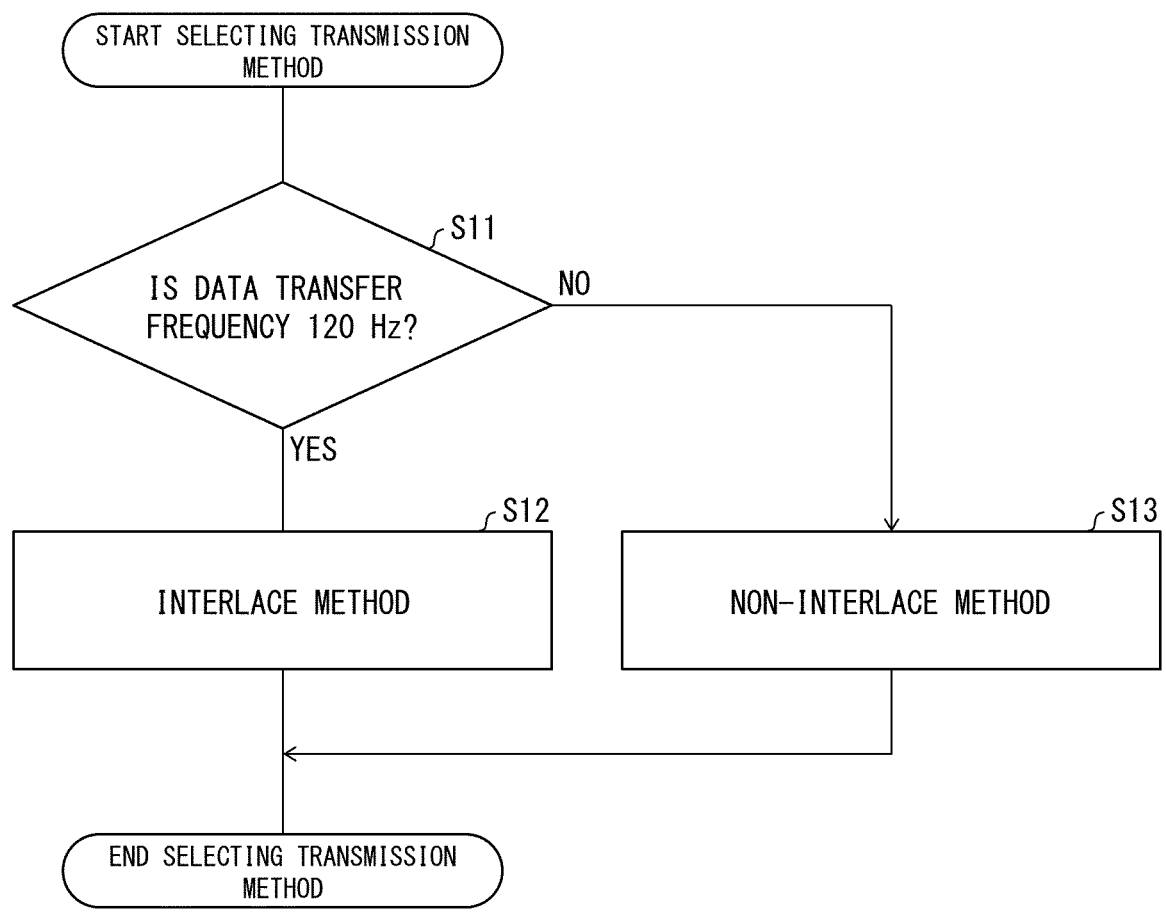
FIG. 2 is a flow chart illustrating a flow of a process in which a transmission method for transmitting display data in a host processor illustrated in FIG. 1 is selected.

FIG. 2 is a flow chart illustrating a flow of a process in which a transmission method for transmitting display data in the host processor 101 is selected. Note that a data transfer frequency identified by the transfer frequency identifying section 10*a* is assumed to be 120 Hz.

The display data transmitting circuit 11 determines whether or not the data transfer frequency identified by the transfer frequency identifying section 10*a* is 120 Hz (Step S11). In a case where the data transfer frequency is determined to be 120 Hz (Yes in step S11), the display data transmitting circuit 11 selects an interlace method (Step S12). In a case where the data transfer frequency is determined to be not 120 Hz (No in step S11), the display data transmitting circuit 11 selects a non-interlace method (Step S13). Then the selection of the transmission method ends. Then, the display data transmitting circuit 11 transmits, to the driver 102, the display data by the transmission method thus selected.

In a case where the driver 102 has received the result of the identification from the transmission amount identifying circuit 10 and the display data transmitted from the host processor 101 by the interlace method, the driver 102 drives the panel 103 by interlaced driving. However, in a case where the driver 102 includes a VRAM having a capacity of an entire screen of the panel 103 (of one frame), the driver 102 can store, in the VRAM, (i) pieces of display data (pieces of display data of even-numbered lines: of half a frame) transmitted by an interlace method and (ii) pieces of display data (pieces of display data of odd-numbered lines: of half a frame) transmitted by the interlace method. Therefore, in such a case, the driver 102 can drive the panel 103 by progressive driving with use of the pieces of display data of one frame which are stored in the VRAM.

In the case where the driver 102 has received display data transmitted from the host processor 101 by a non-interlace method, the driver 102 can drive the panel 103 by progressive driving, or can drive the panel 103 by interlaced driving through dividing, with use of the VRAM, the pieces of display data of one frame into even-numbered lines and odd-numbered lines.

Note that in Embodiments 2 and 3 described later, the process after the driver 102 has received display data from the host processor 101 is, as described above, likewise not affected by a transmission method. That is, the driver 102 can drive the panel 103 by any of interlaced driving and progressive driving.

In a case where display data is transmitted to the display device by an interlace method, it is alternatively possible that the display data is directly transmitted to the panel 103 without routing through the driver 102, so that the panel 103 is directly driven. This also applies to Embodiments 2 and 3 described below.

Note that in a case where the data transfer frequency is not 120 Hz in the step S11, the data transfer frequency is, for example, 60 Hz or 30 Hz which is lower than 120 Hz. That is, a frequency higher than 120 Hz is not included. Note also that a frequency of 120 Hz as a reference by which the transmission method is selected is merely illustrative, and that the data transfer frequency is not limited to 120 Hz.

(Effects)

In a case where a data transfer frequency of display data is set to 120 Hz, an electric power consumption of the host processor 101 can be thus reduced by transmitting the display data to the driver 102 by an interlace method so as to narrow a bandwidth and consequently reduce a transmission rate. In addition, by narrowing the bandwidth, it is possible to reduce the quality of a transmission line. This allows for a reduction in cost of the transmission line.

Meanwhile, in a case where a data transfer frequency of display data is not set to 120 Hz, that is, in a case where the data transfer frequency is lowered to, for example, 30 Hz or 1 Hz, the bandwidth is narrow in the first place. Therefore, in this case, the display data is transmitted to the driver 102 by a non-interlace method. After the display data has been transmitted, a decrease in display quality can be suppressed by updating image data of the entire panel 103.

Note that it is alternatively possible that (i) a non-interlace method is selected in a case where a data transfer frequency is determined to be 120 Hz in the flow chart illustrated in FIG. 2 and (ii) an interlace method is selected in a case where the data transfer frequency is determined to be not 120 Hz in the flow chart illustrated in FIG. 2. Specifically, in a case where the data transfer frequency is 120 Hz, display data is transmitted to the driver 102 by a non-interlace method, and then image data of the entire panel 103 is updated. In a case where the data transfer frequency is not 120 Hz, such as 30 Hz or 1 Hz, the display data is transmitted to the driver 102 by an interlace method, and then the panel 103 displays display data by an interlace method. In this way, it is possible to (i) allow for a high-resolution video image in a case where a data transfer frequency is 120 Hz and (ii) further reduce an electric power consumption in a case where a data transfer frequency is not 120 Hz, such as 30 Hz or 1 Hz.

Embodiment 2

The following description will discuss another embodiment of the present invention. Note that, for convenience, members which are identical in function to those described in Embodiment 1 are given respective identical reference signs, and will not be described.

(Smartphone)

Figure 4:
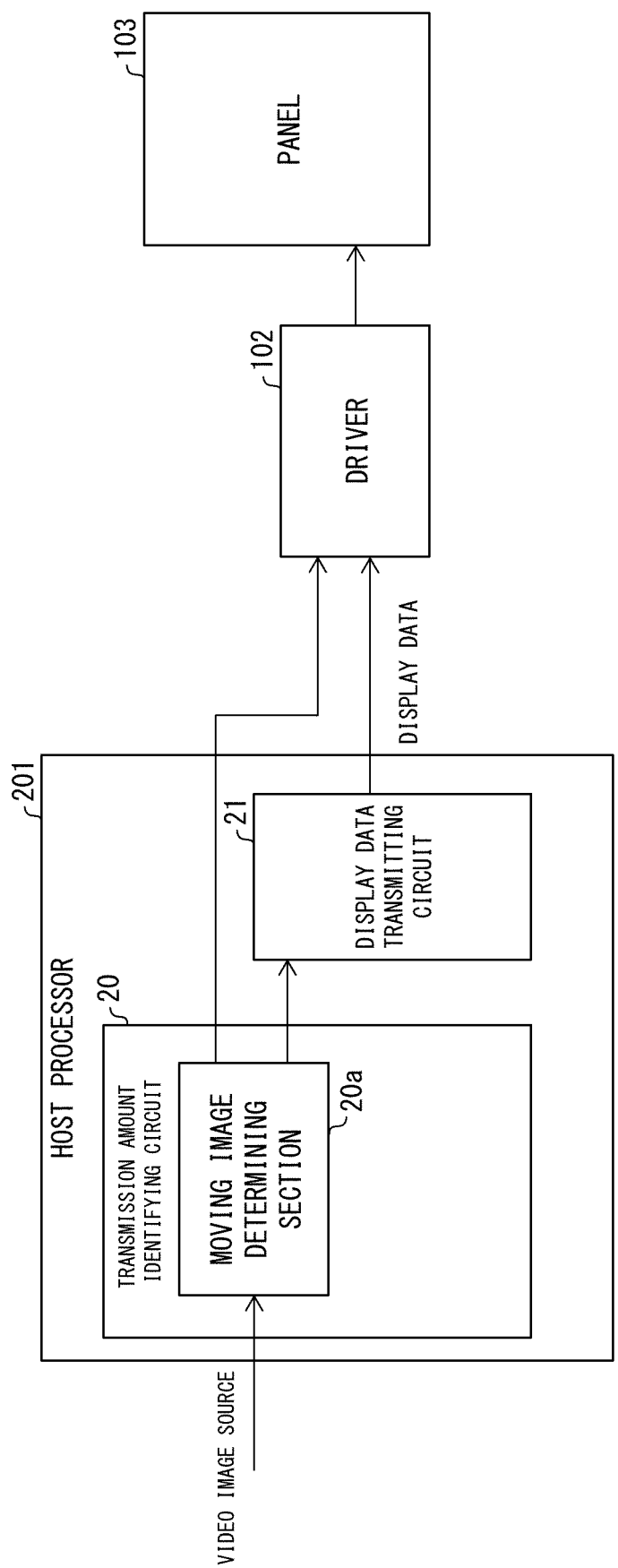
FIG. 4 is a block diagram schematically illustrating a configuration of a smartphone in accordance with Embodiment 2 of the present invention.

FIG. 4 is a block diagram schematically illustrating a configuration of a smartphone in accordance with Embodiment 2.

As illustrated in FIG. 4, the smartphone is different from the smartphone in accordance with Embodiment 1 in terms of a configuration of a host processor 201. The host processor 201 includes a transmission amount identifying circuit

20 and a display data transmitting circuit 21. The transmission amount identifying circuit 20 includes a moving image determining section 20a. Embodiment 2 will discuss an example in which a transmission method for transmitting display data is selected according to whether or not the display data is of a moving image.

In a case where display data is of a moving image, a bandwidth is wide, so that a transmission rate is high. This causes an increase in electric power consumption when the display data is transferred. Therefore, Embodiment 2 will discuss an example in which, in a case where display data is of a moving image, an increase in electric power consumption is suppressed by selecting an interlace method as a transmission method for transmitting the display data, so that a bandwidth is narrow and consequently a transmission rate is reduced.

As illustrated in FIG. 4, the transmission amount identifying circuit 20 includes the moving image determining section 20a for determining whether or not display data to be transferred to the display device is of a moving image. In a case where images of frames by which display data supplied from a video image source is preceded and followed are different from the display data, the moving image determining section 20a determines that the display data is of a moving image. The result of the determination is transmitted to the display data transmitting circuit 21 and to a driver 102. Then, depending on the result produced by the moving image determining section 20a, the display data transmitting circuit 21 transmits the display data to the display device by an interlace method or a non-interlace method.

(Process of Selecting Transmission Method)

Figure 5:
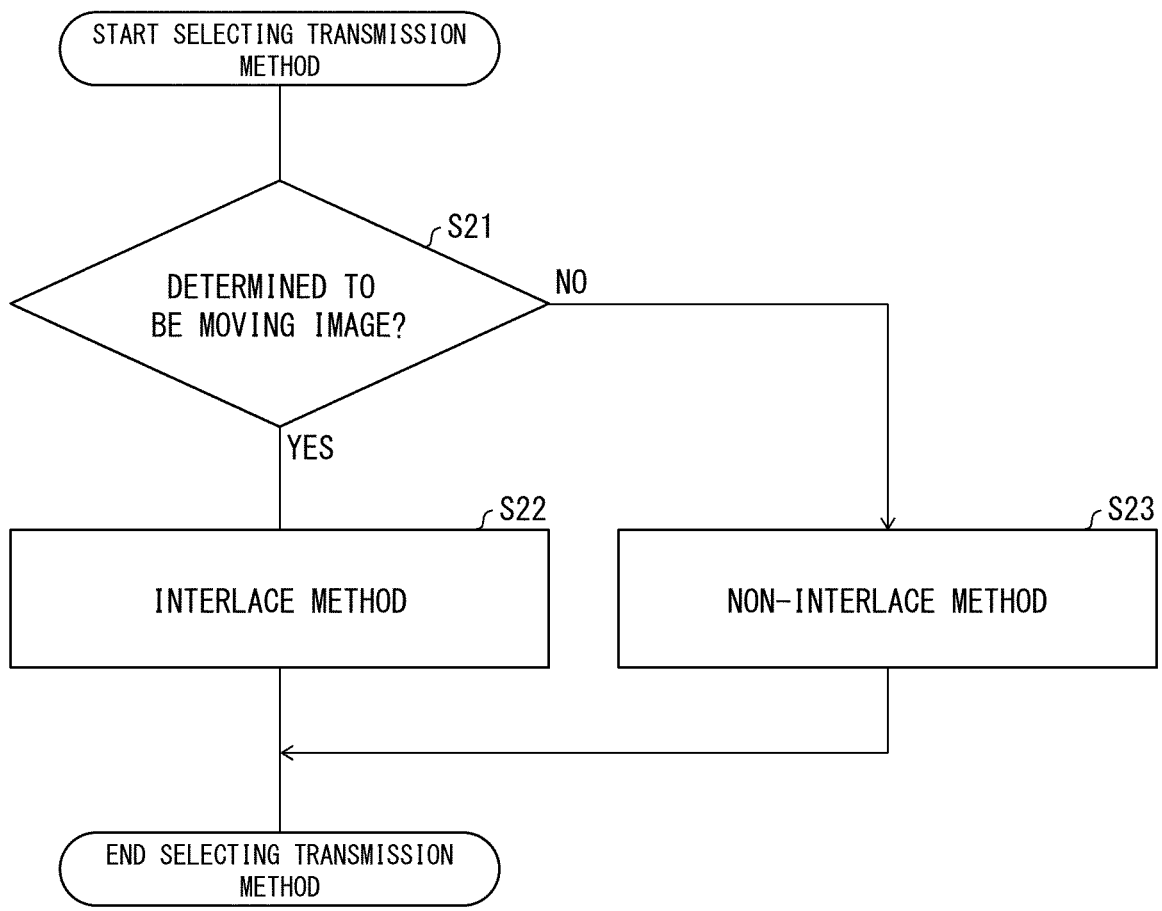
FIG. 5 is a flow chart illustrating a flow of a process in which a transmission method for transmitting display data in a host processor illustrated in FIG. 4 is selected.

FIG. 5 is a flow chart illustrating a flow of a process in which a transmission method for transmitting display data in the host processor 201 is selected.

The display data transmitting circuit 21 determines whether or not the moving image determining section 20a has determined that display data from a video image source is of a moving image (Step S21). Note that in a case where the display data is determined to be of a moving image (Yes in step S21), the display data transmitting circuit 21 selects an interlace method (Step S22). In a case where the display data is determined to be not of a moving image (No in step S21), the display data transmitting circuit 21 selects a non-interlace method (Step S23). Then the selection of the transmission method ends. Then, the display data transmitting circuit 21 transmits, to the driver 102, the display data by the transmission method thus selected. In this case, the moving image determining section 20a transmits, to the driver 102, either (i) moving image information indicating that the display data is of a moving image or (ii) still image information indicating that the display data is of a still image.

(Effects)

In a case where display data is of a moving image, an electric power consumption can be thus reduced by transmitting the display data to the driver 102 by an interlace method so as to narrow a bandwidth and consequently reduce a transmission rate. In addition, by narrowing the bandwidth, it is possible to reduce the quality of a transmission line. This allows for a reduction in cost of the transmission line.

Meanwhile, in a case where display data is of a still image, the bandwidth is narrow in the first place. Therefore, in this case, the display data is transmitted to the driver 102 by a non-interlace method. After the display data has been transmitted, a decrease in display quality can be suppressed by updating image data of the entire panel 103.

Embodiment 3

The following description will discuss another embodiment of the present invention. Note that, for convenience, members which are identical in function to those described in Embodiments 1 and 2 are given respective identical reference signs, and will not be described.

Embodiment 3 will discuss an example in which a transmission method for transmitting display data is selected by combining (i) the method of Embodiment 1 for selecting a transmission method of display data by a data transfer frequency and (ii) the method of Embodiment 2 for selecting a transmission method of display data according to whether or not the display data is of a moving image.

(Smartphone)

Figure 6:
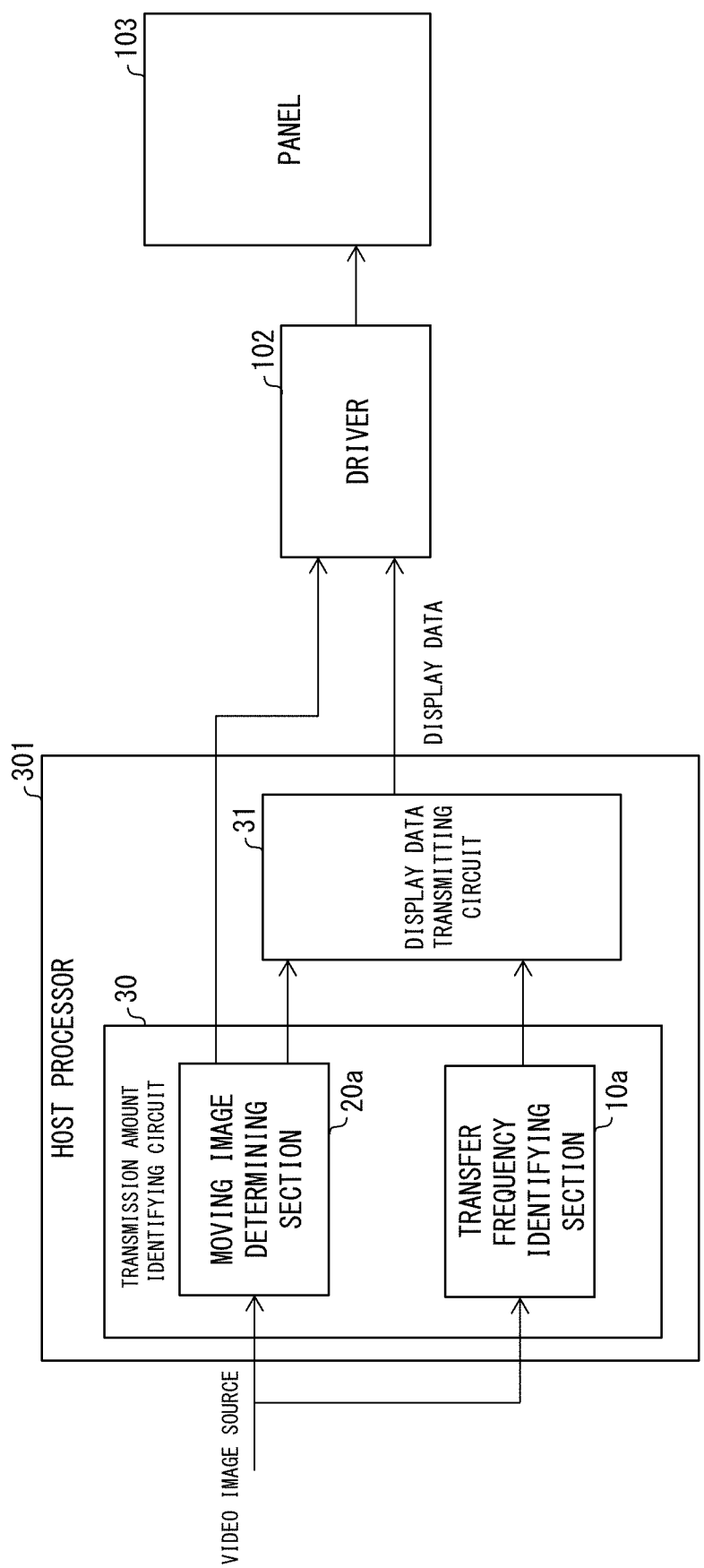
FIG. 6 is a block diagram schematically illustrating a configuration of a smartphone in accordance with Embodiment 3 of the present invention.

FIG. 6 is a block diagram schematically illustrating a configuration of a smartphone in accordance with Embodiment 3.

As illustrated in FIG. 6, the smartphone is different from the smartphones in accordance with Embodiments 1 and 2 in terms of a configuration of a host processor 301. The host processor 301 includes a transmission amount identifying circuit 30 and a display data transmitting circuit 31. The transmission amount identifying circuit 30 includes a moving image determining section 20a and a transfer frequency identifying section 10a.

As illustrated in FIG. 6, the transmission amount identifying circuit 30 includes (i) the transfer frequency identifying section 10a for identifying a transfer frequency at which display data is transferred to a display device (driver 102, panel 103) and (ii) the moving image determining section 20a for determining whether or not display data to be transferred to the display device is of a moving image. The transfer frequency identifying section 10a identifies a data transfer frequency which is set for display data that has been transmitted from a video image source. In a case where images of frames by which the display data supplied from the video image source is preceded and followed are different from the display data, the moving image determining section 20a determines that the display data is of a moving image. The results of the identification and determination are transmitted to a display data transmitting circuit 21 and to the driver 102. Then, according to the transfer frequency identified by the transfer frequency identifying section 10a and according to the result produced by the moving image determining section 20a, the display data transmitting circuit 31 transmits the display data to the display device by an interlace method or a non-interlace method.

(Process of Selecting Transmission Method)

Figure 7:
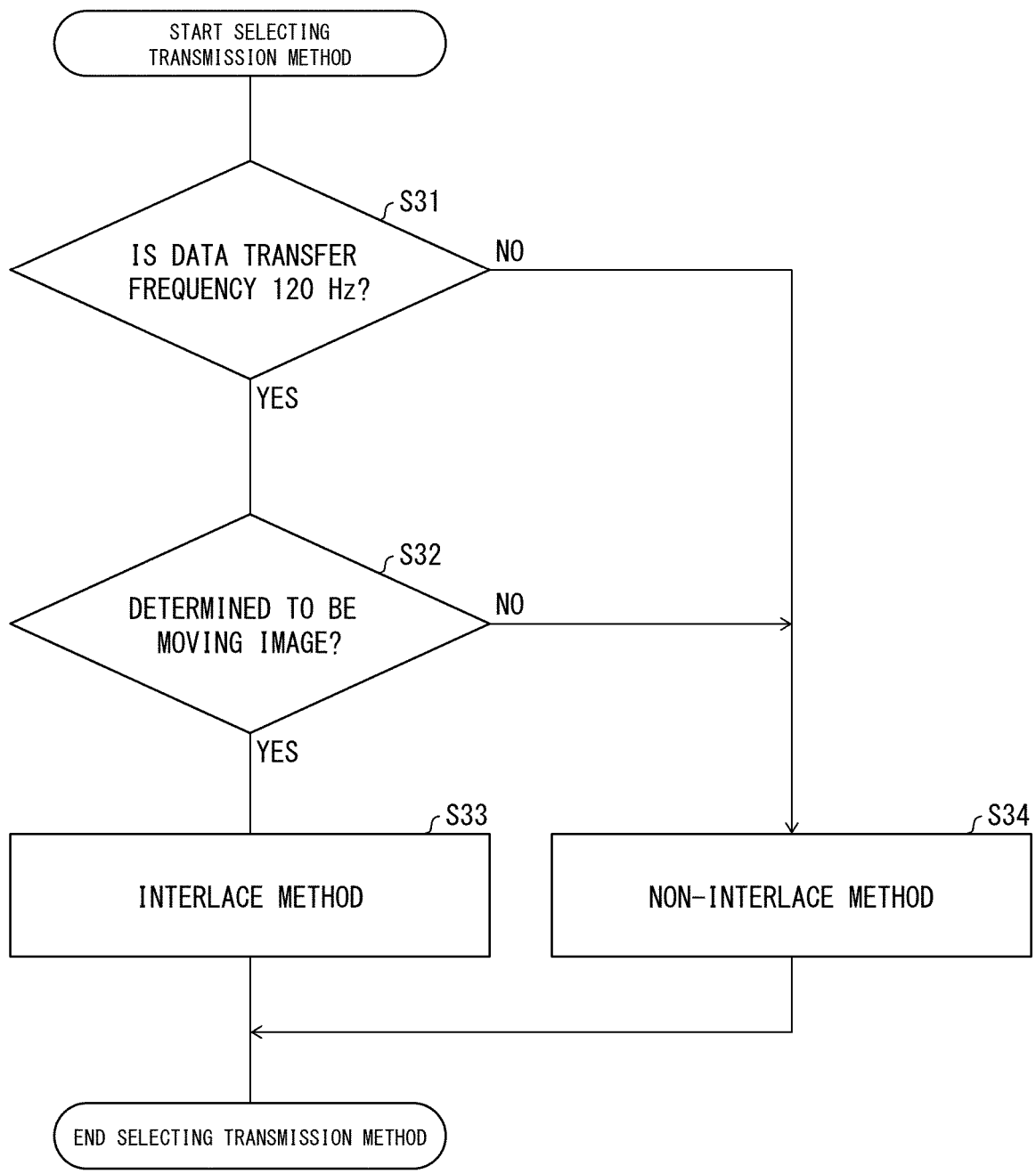
FIG. 7 is a flow chart illustrating a flow of a process in which a transmission method for transmitting display data in a host processor illustrated in FIG. 6 is selected.

FIG. 7 is a flow chart illustrating a flow of a process in which a transmission method for transmitting display data in the host processor 301 is selected. Note that a data transfer frequency identified by the transfer frequency identifying section 10a is assumed to be 120 Hz.

The display data transmitting circuit 31 determines whether or not the data transfer frequency identified by the transfer frequency identifying section 10a is 120 Hz (Step S31). In a case where the data transfer frequency is determined to be 120 Hz, the process proceeds to a step S32 (Step S31: Yes). In a case where the data transfer frequency is determined to be not 120 Hz, the display data transmitting circuit 31 selects a non-interlace method (Step S34: No). Then the selection of the transmission method ends.

Meanwhile, in a case of Yes in the step S31, that is, in a case where the data transfer frequency is determined to be 120 Hz, it is determined whether or not the moving image determining section 20a has determined that the display data from the video image source is of a moving image (Step S32). Note that the display data is determined to be of a moving image (Step S32: Yes), the display data transmitting circuit 31 selects an interlace method (Step S33). In a case where the display data is determined to be not of a moving image (Step S32: No), the display data transmitting circuit 31 selects a non-interlace method (Step S34). Then the selection of the transmission method ends.

After the transmission method has been thus selected, the display data transmitting circuit 11 transmits, to the driver 102, the display data by the transmission method selected.

Note that in a case where the data transfer frequency is not 120 Hz in the step S31, the data transfer frequency is, for example, 60 Hz or 30 Hz which is lower than 120 Hz. That is, a frequency higher than 120 Hz is not included.

(Effects)

Even in a case where a data transfer frequency of display data is 120 Hz, a bandwidth in a transmission line does not become excessively wide as long as the display data is not of a moving image. This allows a non-interlace method to be selected. Note that in a case where display data is transmitted to the driver 102 by a non-interlace method, it is easy to drive the panel 103 in a progressive mode. This makes it possible to suppress a decrease in display quality even in a case where a data transfer frequency of the display data is 120 Hz.

In a case where a data transfer frequency of display data is 120 Hz and where the display data is of a moving image, a bandwidth in a transmission line needs to be notably wide. In this case, the display data is preferably transmitted by an interlace method in order to narrow the bandwidth.

According to Embodiment 3, it is thus possible to transmit display data by an interlace method, according to the type of a moving image.

Variation

A transmission amount of display data transferred from a video image source to a display device varies, depending on an application to be executed by a smartphone. That is, a transmission amount of display data is set per application.

Therefore, according to the present variation, a transmission amount of display data, which is associated with an application being executed, is identified unlike Embodiment 1 in which a transmission amount of display data being transferred is identified.

Figure 8:
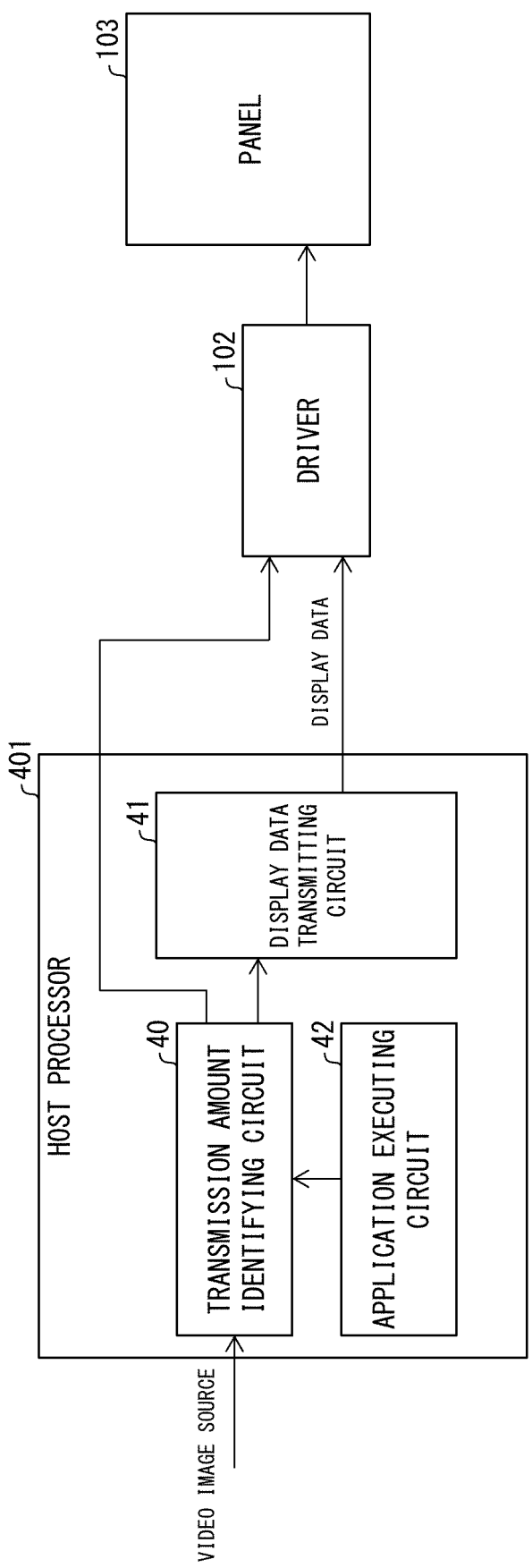
FIG. 8 is a block diagram schematically illustrating a configuration of a smartphone in accordance with a variation of Embodiments 1 through 3 of the present invention.

Specifically, as illustrated in FIG. 8, a host processor 401 includes a transmission amount identifying circuit 40, a display data transmitting circuit 41, and an application executing circuit (application executing section) 42.

In a case where the application executing circuit 42 has received, from a main body of a smartphone, an instruction to execute an application, the application executing circuit 42 executes the application and transmits, to the transmission amount identifying circuit 40, a signal which specifies the application being executed.

The transmission amount identifying circuit 40 is identical in function to the transmission amount identifying circuit 10 in Embodiment 1, except that the transmission amount identifying circuit 40 identifies a transmission amount of display data with reference to a signal (signal which specifies an application being executed) transmitted from the application executing circuit 42. Specifically, the transmission amount identifying circuit 40 is configured to identify a transmission amount of display data which corresponds to an application being executed by the application executing circuit 42. The result of the identification is transmitted to the display data transmitting circuit 41 and to the driver 102.

Then, depending on the transmission amount of the display data identified by the transmission amount identifying circuit 40, the display data transmitting circuit 41 transmits the display data to the driver 102 by an interlace method or a non-interlace method.

Since a transmission method for transmitting display data is thus selected according to an application, it is possible to (i) suppress an electric power consumption during execution of an application and (ii) prevent a decrease in display quality.

Software Implementation Example

Control blocks of the host processors 101 through 401 (in particular, the display data transmitting circuits 11 through 42) can be realized by a logic circuit (hardware) provided in an integrated circuit (IC chip) or the like or can be alternatively realized by software as executed by a central processing unit (CPU).

In the latter case, the host processors 101 through 401 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

Recapitulation

A transfer control device in accordance with Aspect 1 of the present invention is a transfer control device (host processor 101) for controlling a transfer of display data from a video image source to a display device (driver 102, panel 103), including: a transmission amount identifying section (transmission amount identifying circuit 10) which identifies a transmission amount of display data to be transferred to the display device (driver 102, panel 103); and a display data transmitting section (display data transmitting circuit 11) which transmits, to the display device, the display data by an interlace method or a non-interlace method, depending on the transmission amount identified by the transmission amount identifying section.

According to the arrangement, display data is transmitted to the display device by an interlace method or a non-interlace method, depending on a transmission amount of the display data. This makes it possible to reduce an electric power consumption and suppress a decrease in display quality. For example, in a case where a transmission amount of display data to be transferred from a video image source to the display device is a preset value or more, transmitting the display data to the display device by an interlace method allows a bandwidth to be narrowed, so that a transmission rate can be reduced. This allows for a reduction in electric power consumption. Meanwhile, in a case where a transmission amount of display data to be transferred from a video image source to the display device is less than a preset value, the display data is to be transmitted to the display device by a non-interlace method. In this case, causing the display device to display the transmitted display data by a non-interlace method (progressive mode) as with the transmission method makes it possible to display a video image having a high display quality.

Even in a case where a transmission amount of display data to be transferred from a video image source to the display device is a preset value or more, lossy data compression for narrowing a bandwidth is unnecessary. This makes it possible to suppress a decrease in display quality of a video image to be displayed by the display device.

In addition, in a case where a transmission amount of display data to be transferred from a video image source to the display device is a preset value or more, transmitting the display data to the display device by a non-interlace method makes it possible to display a high-resolution video image having a large amount of display data. This allows the display quality to be further improved. Meanwhile, in a case where a transmission amount of display data to be transferred from a video image source to the display device is less than a preset value, transmitting the display data to the display device by an interlace method makes it possible to reduce a transfer bandwidth. This allows for a further reduction in electric power consumption.

In Aspect 2 of the present invention, the transfer control device in accordance with Aspect 1 of the present invention can be arranged so that: the transmission amount identifying section (transmission amount identifying circuit 10) includes a transfer frequency identifying section 10a for identifying a transfer frequency at which display data is to be transferred to the display device (driver 102, panel 103); and the display data transmitting section (display data transmitting circuit 11) transmits, to the display device, the display data by an interlace method or a non-interlace method, depending on the transfer frequency identified by the transfer frequency identifying section 10a.

According to the arrangement, display data is transmitted to the display device by an interlace method or a non-interlace method, depending on a transfer frequency. This makes it possible, as with Aspect 1, to reduce an electric power consumption and suppress a decrease in display quality. Specifically, in a case where a transfer frequency is high, a bandwidth is wide and a transmission rate is high. This causes an electric power consumption to be large. Therefore, transmitting display data by an interlace method in order to narrow the bandwidth allows the transmission rate to be lowered. This allows for a reduction in electric power consumption. In this case also, lossy data compression for narrowing the bandwidth is not carried out. This makes it possible to suppress a decrease in display quality.

In Aspect 3 of the present invention, the transfer control device in accordance with Aspect 1 of the present invention can be arranged so that: the transmission amount identifying section (transmission amount identifying circuit 20) includes a moving image determining section 20a for determining whether or not display data to be transferred to the display device (driver 102, panel 103) is of a moving image; and the display data transmitting section (display data transmitting circuit 21) transmits, to the display device (driver 102, panel 103), the display data by an interlace method or a non-interlace method, depending on a result of the determining by the moving image determining section 20a.

According to the arrangement, display data is transmitted to the display device by an interlace method or a non-interlace method, depending on whether or not the display data is of a moving image. This makes it possible, as with Aspect 1, to reduce an electric power consumption and suppress a decrease in display quality. Specifically, in a case where display data is of a moving image, a bandwidth is wide and a transmission rate is high. This causes an electric power consumption to be large. Therefore, transmitting the display data by an interlace method in order to narrow the bandwidth allows the transmission rate to be lowered. This allows for a reduction in electric power consumption. In this case also, lossy data compression for narrowing the bandwidth is not carried out. This makes it possible to suppress a decrease in display quality.

In Aspect 4 of the present invention, the transfer control device in accordance with Aspect 1 of the present invention can be arranged so that: the transmission amount identifying section (transmission amount identifying circuit 30) includes a transfer frequency identifying section 10a for identifying a transfer frequency at which display data is to be transferred to the display device (driver 102, panel 103) and a moving image determining section 20a for determining whether or not the display data to be transferred to the display device (driver 102, panel 103) is of a moving image; and the display data transmitting section (display data transmitting circuit 31) transmits, to the display device (driver 102, panel 103), the display data by an interlace method or a non-interlace method, depending on (i) the transfer frequency identified by the transfer frequency identifying section 10a or (ii) a result of the determining by the moving image determining section 20a.

With the arrangement, it is possible to bring about effects similar to those of Aspects 2 and 3. Specifically, even in a case where the transfer frequency of the display data is a certain value or more, it is possible to transmit the display data by a non-interlace method as long as the display data is not of a moving image.

In Aspect 5 of the present invention, the transfer control device in accordance with Aspect 1 of the present invention can further include: an application executing section (application executing circuit 42) which executes an application, the transmission amount identifying section (transmission amount identifying circuit 40) identifying a transmission amount of display data which corresponds to an application to be executed by the application executing section (application executing circuit 42).

With the arrangement, a transmission method for transmitting display data can be selected so as to reduce an electric power consumption and suppress a decrease in display quality according to an application being executed.

In Aspect 6 of the present invention, the transfer control device in accordance with any one of Aspects 1 through 5 can be arranged so that the display data transmitting section (display data transmitting circuits 11 through 41) transmits display data to the display device (driver 102, panel 103) by an interlace method in a case where a transmission amount of the display data, which transmission amount is identified by the transmission amount identifying section (transmission amount identifying circuits 10 through 40), is a preset value or more.

According to the arrangement, transmitting display data to the display device by an interlace method in a case where a transmission amount of the display data is a preset value or more allows a bandwidth to be narrowed, so that a transmission rate is lowered. This allows for a reduction in electric power consumption. Note that the preset value (transmission amount) is preferably set such that a bandwidth (transmission rate) in a transmission line when display data is transmitted is lower than a certain value so that an electric power consumption for transmitting the display data is not more than a certain value.

A terminal device in accordance with Aspect 7 of the present invention includes a transfer control device (host processors 101 through 401) described in any one of Aspects 1 through 6.

With the arrangement, it is possible to achieve a terminal device capable of reducing an electric power consumption and suppressing a decrease in display quality.

A method in accordance with Aspect 8 of the present invention is a method for controlling a transfer of display data from a video image source to a display device (driver 102, panel 103), including: a first step of identifying a transmission amount of display data to be transferred to the display device (driver 102, panel 103); and a second step of transmitting, to the display device (driver 102, panel 103), the display data by an interlace method or a non-interlace method, depending on the transmission amount identified in the first step.

With the arrangement, it is possible to bring about effects similar to those of Aspect 1.

A transfer control device in accordance with the foregoing aspects of the present invention can be achieved by a computer. In such a case, the present invention encompasses: a transfer control program for the transfer control device which transfer control program controls a computer to operate as the foregoing sections (software elements) of the transfer control device so that the transfer control device can be achieved by the computer; and a computer-readable recording medium in which the transfer control program is recorded.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 10, 20, 30, 40 Transmission amount identifying circuit (transmission amount identifying section)
10a Transfer frequency identifying section
11, 21, 31, 41 Display data transmitting circuit (display data transmitting section)
20a Moving image determining section
42 Application executing circuit
101, 201, 301, 401 Host processor (transfer control device)
102 Driver (display device)
103 Panel (display device)

The invention claimed is:

1. A transfer control device for controlling a transfer of display data from a video image source to a display device, comprising:
a transmission amount identifying section which identifies a transmission amount of display data to be transferred to the display device; and
a display data transmitting section which transmits, to the display device, the display data by an interlace method or a non-interlace method, depending on the transmission amount identified by the transmission amount identifying section, wherein
in a case where the transmission amount identified by the transmission amount identifying section is a preset transmission amount or more, the display data transmitting section transmitting the display data to the display device by the interlace method,
the transmission amount identifying section includes
a transfer frequency identifying section for identifying a transfer frequency at which the display data is to be transferred to the display device, and
a moving image determining section for determining whether or not the display data to be transferred to the display device is of a moving image;
in a case where the transfer frequency identified by the transfer frequency identifying section is a preset transfer frequency and the moving image determining section determines that the display data is not of a moving image, the display data transmitting section transmits the display data to the display device by the non-interlace method; and
in a case where the transfer frequency identified by the transfer frequency identifying section is the preset transfer frequency and the moving image determining section determines that the display data is of a moving image, the display data transmitting section transmits the display data to the display device by the interlace method.

2. The transfer control device as set forth in claim 1, further comprising:
an application executing section which executes an application,
the transmission amount identifying section identifying a transmission amount of display data which corresponds to an application to be executed by the application executing section.

3. The transfer control device as set forth in claim 1, wherein
the display data transmitting section transmits display data to the display device by an interlace method in a case where a transmission amount of the display data, which transmission amount is identified by the transmission amount identifying section, is a preset value or more.

4. A terminal device comprising:
the transfer control device recited in claim 1.

5. The transfer control device set forth in claim 1, wherein the preset transmission amount is set such that a bandwidth in a transmission line when the display data is lower than a certain value so that an electric power consumption for transmitting the display data is not more than a certain value.

6. A method for controlling a transfer of display data from a video image source to a display device, comprising:
a first step of identifying a transmission amount of display data to be transferred to the display device; and
a second step of transmitting, to the display device, the display data by an interlace method or a non-interlace method, depending on the transmission amount identified in the first step,
wherein in a case where the transmission amount identified is a preset transmission amount or more, the display data is transmitted to the display device by the interlace method,
the first step includes
identifying a transfer frequency at which the display data is to be transferred to the display device, and
determining whether or not the display data to be transferred to the display device is of a moving image;

in a case where identified transfer frequency is a preset transfer frequency and the display data is not of a moving image, the display data is transmitted to the display device by the non-interlace method; and in a case where identified transfer frequency is the preset transfer frequency and the display data is of a moving image, the display data is transmitted to the display device by the interlace method.

* * * * *